United States Patent [19]
Moratalla

[11] Patent Number: 6,029,467
[45] Date of Patent: Feb. 29, 2000

[54] APPARATUS FOR REGENERATING DESICCANTS IN A CLOSED CYCLE

[76] Inventor: Jose M. Moratalla, P.O. Box 2603, Dunedin, Fla. 34697-2603

[21] Appl. No.: 09/052,598

[22] Filed: Mar. 31, 1998

Related U.S. Application Data

[63] Continuation-in-part of application No. 08/696,370, Aug. 13, 1996, Pat. No. 5,732,562.
[51] Int. Cl.⁷ ...................................... F25D 17/06
[52] U.S. Cl. ..................... 62/271; 62/54; 165/8
[58] Field of Search ................. 62/93, 94, 271; 165/6, 7, 8, 9

[56] References Cited

U.S. PATENT DOCUMENTS

| | | | |
|---|---|---|---|
| 2,690,656 | 10/1954 | Cummings | 62/94 |
| 3,774,374 | 11/1973 | Dufour et al. | 55/316 |
| 4,805,317 | 2/1989 | Inglis et al. | 34/259 |
| 5,040,375 | 8/1991 | Von Dobeln | 62/94 |
| 5,170,633 | 12/1992 | Kaplan | 62/94 |
| 5,325,676 | 7/1994 | Meckler | 62/93 |
| 5,732,562 | 3/1998 | Moratalla | 62/94 |

*Primary Examiner*—William Doerrler

[57] ABSTRACT

A method and apparatus for conditioning air through the removal of moisture from air to be conditioned comprising a first path for a first flow of air to be dehumidified, the first path having an input end and an output end with a first blower between the input end and the output end to effect the movement of air from the input end to the output end; a second path for a second flow of air, the second path being independent of the first path and adapted to remove moisture from the second flow of air, the second path being in a closed loop configuration with a second blower for continuously moving the second flow of air around the second path and with a plurality of temperature changing devices sequentially positioned in the second path including an air precooling device, a cooling condenser device for condensing moisture from the second flow of air, a reheating device coupled to the precooling device, and a heating device; and a desiccant wheel with a motor to rotate the wheel in a continuous path of travel through a first zone and a second zone, the first zone being in the first path of travel between the input end and the output end, the second zone being in the second path of travel between the heating device and the precooling device.

2 Claims, 13 Drawing Sheets

APPARATUS FOR REGENERATING DESICCANTS IN A CLOSED CYCLE

CROSS-REFERENCE TO RELATED APPLICATIONS

This application is a continuation-in-part of application Ser. No. 08/696,370 filed Aug. 13, 1996, now U.S. Pat. No. 5,732,562, the subject matter of which is incorporated herein by reference.

BACKGROUND OF THE INVENTION

1. Field of the Invention

The present invention relates to an improved apparatus for regenerating desiccant in a closed cycle and, more particularly, to providing a second regeneration path totally in a closed loop, a closed cycle desiccant regeneration system wherein an array of heat exchangers recovers a major percentage of the thermal energy that drives the cycle with only condensation constituting energy lost.

2. Description of the Prior Art

Figure 1:
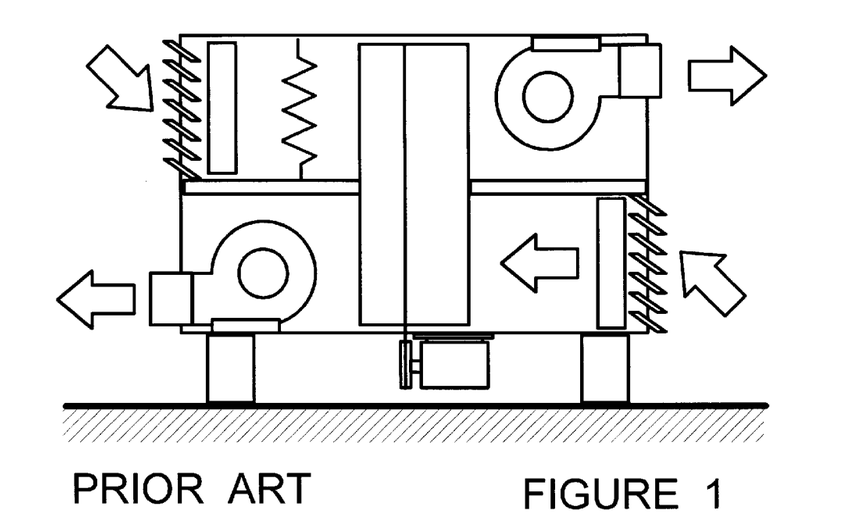
FIGS. 1 and 2 are illustrations of prior art devices and/or systems including the Pennington cycle and the Munters machine, U.S. Pat. Nos. 2,700,537 and 2,926,502, and a system using a heat exchanger as a heat recovery.

Open cycle desiccant systems have been known from the early 1940's. In 1955, Pennington U.S. Pat. No. 2,700,537 was using rotary heat exchangers impregnated with desiccants. Today dual path machines similar to FIG. 1 herein use the Pennington cycle. In 1960, Munters U.S. Pat. No. 2,926,502 improved this cycle. The '502 patent discloses an air conditioning system including the recycling of air, at least three air flow paths, with all embodiments including a recycling of interior space conditioned air path, an open cycle regeneration path and a supplementary air path for an additional heat exchanger.

U.S. Pat. No. 4,594,860 to Coellner et al discloses an open cycle desiccant air conditioning system when the regeneration path is an open cycle and very similar to Pennington's cycle. U.S. Pat. No. 2,186,844 to Smith discloses a refrigeration apparatus wherein heat from a mechanical refrigeration unit regenerates desiccant, very similar in concept to U.S. Pat. No. 5,502,975 to Brickley et al and U.S. Pat. No. 5,517,828 to Calton et al. The common factor is the open cycle regeneration path.

U.S. Pat. No. 5,353,606 to Yoho et al addresses a three path desiccant air conditioning system. Again, all these regeneration paths are open cycle.

Figure 2:
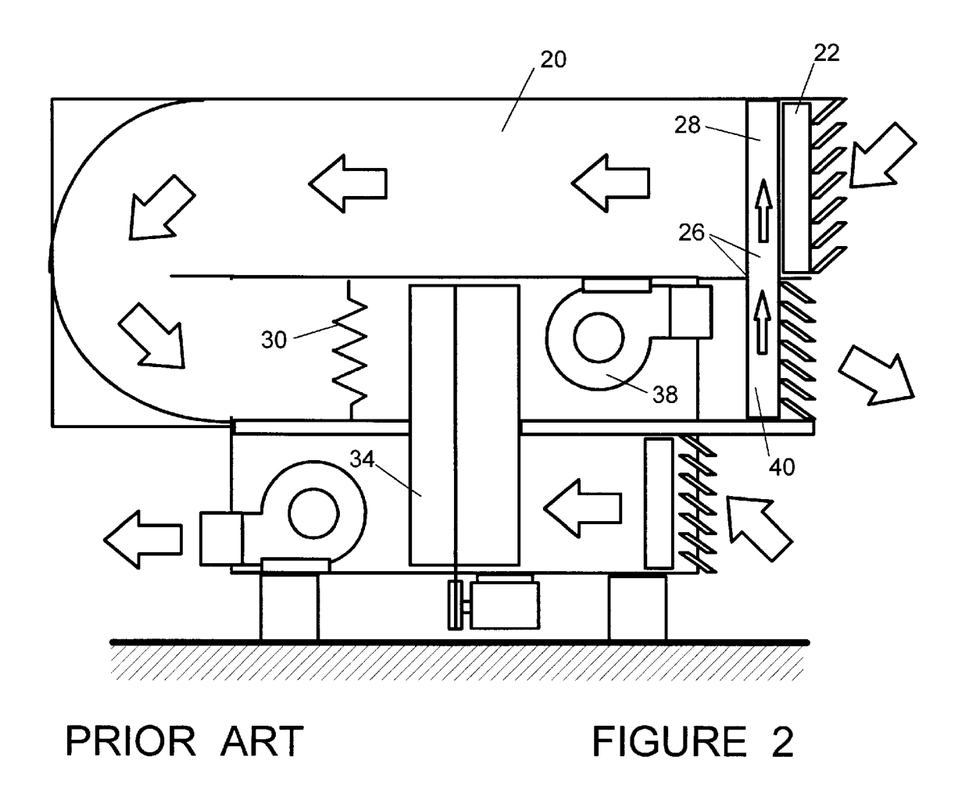

The art of FIG. 2 herein represents a modified open cycle desiccant dryer. The open cycle regeneration path 20 intake's air to a filter 22 and across a heat exchanger 26 to pre-heat the outside air in the first section 28 and with the air heated by a heating device 30 for it to be drawn across a rotary desiccant matrix 34 pulled by a blower 38 to be recooled by a second section of a heat exchanger 40.

As will become evident, nothing in the prior art provides the benefits and advantages that the present invention offers.

SUMMARY OF INVENTION

In the different types of systems for regeneration desiccants, the energy that is used to change the vapor pressure of the desiccant material is rejected to the open space with a component of water vapor and energy in the form of heat. Note FIG. 1. An advance of this technology can be considered the use of a heat exchanger for recovering a fraction of the rejected heat that the system allows to pre-heat the air that is introduced to remove the water from the desiccant. Again, water vapor and heat is rejected and lost from the system. Note FIG. 2. The present invention provides an improved method and system to reduce considerably the loses of regeneration energy using the energy flows in a better way, a closed cycle desiccant regeneration system. Note FIG. 3.

More specifically, the present invention relates to a method and apparatus for conditioning comprising of a first path for a first flow of air to be dehumidified, the first path having an input end and an output end with a first blower between the input end and the output end to effect the movement of air from the input end to the output end; a second path for a second flow of air, the second path being independent of the first path and adapted to remove moisture from the second flow of air, the second path being in a closed loop configuration with a second blower for continuously moving the second flow of air around the second path and with a plurality of temperature changing devices sequentially positioned in the second path including an air precooling device, a cooling condenser device for condensing moisture from the second flow of air, a reheating device coupled to the precooling device, and a heating device; and a desiccant wheel with a motor to rotate the wheel in a continuous path of travel through a first zone and a second zone, the first zone being in the first path of travel between the input end and the output end, the second zone being in the second path of travel between the heating device and the precooling device.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved method and apparatus for regenerating desiccants in a closed cycle which has all of the advantages of the prior art desiccants and none of the disadvantages.

It is another object of the present invention to provide a new and improved method and apparatus for regenerating desiccants in a closed cycle which may be easily and efficiently manufactured and marketed.

It is further object of the present invention to provide a new and improved method and apparatus for regenerating desiccants in a closed cycle which is of durable and reliable constructions.

An even further object of the present invention is to provide a new and improved method and apparatus for regenerating desiccants in a closed cycle which is susceptible of a low cost of manufacture with regard to both materials and labor, and which accordingly is then susceptible of low prices of sale to the consuming public, thereby making such method and apparatus for regenerating desiccants in a closed cycle economically available to the buying public.

Lastly, it is an object of the present invention to provide a new and improved method and dehumidifying system comprising of a first linear path adapted to remove moisture from a first fluid passing through the first path; a second closed loop path adapted to remove moisture from a second fluid recirculating through the second path; and a desiccant member movable between a first zone and a second zone, the first zone being in the first path for absorbing moisture from the first fluid, the second zone being in the second path for removing moisture from the second fluid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such descriptions make reference to the annexed drawings wherein.

The same reference numerals refer to the same parts throughout the various Figures.

DESCRIPTION OF EMBODIMENT

Figure 3:
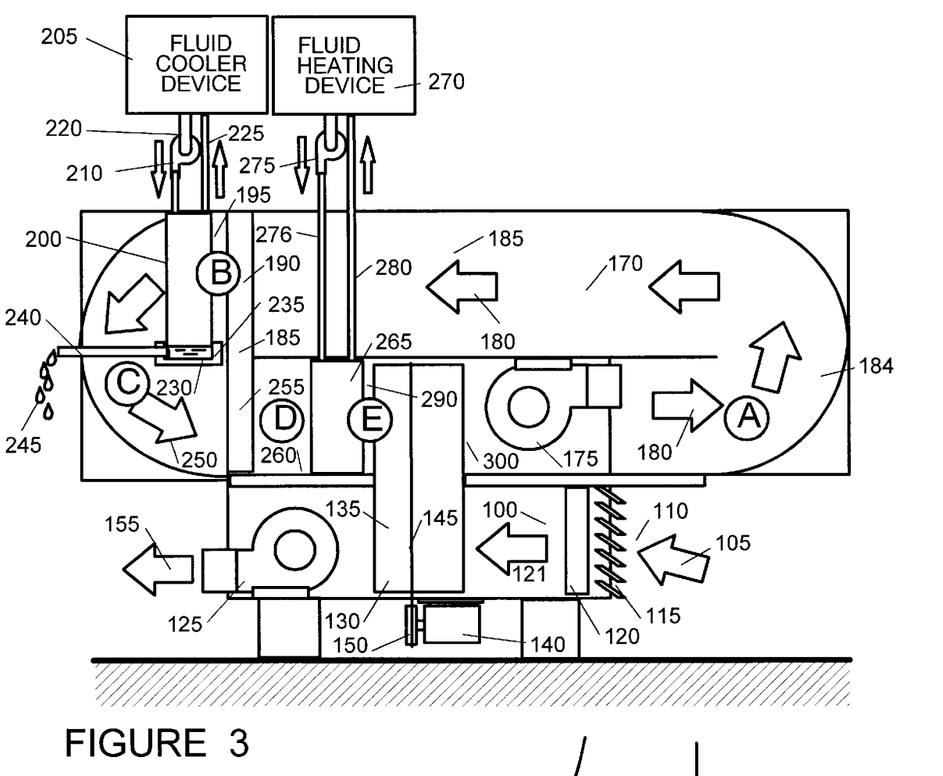
FIG. 3 is a side elevation view with parts removed to show internal construction illustrating the basic concept of the present invention.

With reference now to the drawings of FIG. 3, the first path 100 is integrated for an air or gas intake 105 comprising of an undesired content of humidity, higher than is required, which is drawn through outside air intake 110 and louver 115 and air filter 120 creating a flow of filtered air 121 by means of suction provided by a forced air intake blower 125 which further forces system input air 105 through a desiccant matrix or core 130. This matrix can be shaped in the form of a wheel 135 which is rotating during operation by a motorized driving mechanism 140, the motion being transmitted by a belt or chain 145. The relationship between the motorized driver 140 and belt or chain 145 is with a pulley or roller 150.

Very dry air 155 after the desiccant matrix is pulled by blower 125 which delivers this air 155 as conditioned or processed air essentially free of moisture.

A second path or closed loop regeneration path 170 is integrated and includes a regeneration blower 175 that pushes the very humid air or gas 180 within a duct or passage 185. The air or gas 180 is drawn through a heat exchanger 185. Various types of heat exchangers could be utilized herein such as heat pipes, plate-to-plate, rotary heat exchangers, and the like. The air or gas 180 then flows across precooling section 190 of this heat exchanger. The air 180 is precooled as an air or gas stream 195. The flow is then pushed through a condenser 200, a heat exchanger that allows the cooling of the air or gas to a temperature beneath the dew point through the use of an external fluid cooler device 205 with its working fluid being transmitted by a pump 210 in a closed loop between the heat exchanger 200 and the fluid cooler 205 whereby cooled fluid is transmitted by 220 pipe and returned to 205 by warm pipe 225. The precooled air or gas 195 when crossing the heat exchanger 200 condensates the humidity content 230. The condensed fluid is recollected as a liquid in a drain pan 235 and drained in liquid state 145 out of the closed loop regeneration path 170 through a drain tube 240. The air or gas 250 now is dryer than air or gas 180.

Air or gas 250 is pulled through the closed loop by the regeneration blower 175 across heat exchanger 185 having a reheated section 255. The air 260 is dry and warm and is to be heated up by a heat exchanger 265. The heat for this step is generated by an external fluid heating device 270 with its working fluid transmitted by a pump 275 in a closed loop between the heater heat exchanger 265 and the fluid heater 270 with its working fluid moved in pipe 276 and returning by warm pipe 280. The heated air 290 is now dry and hot and is drawn by the pull effect of blower 175 across the desiccant matrix or core 130. This changes the vapor pressure of the desiccant contained in the matrix 130 rejecting the humidity contents at 300. This is pulled by blower 175 whereby the air or gas 180 will be regenerated again. The cycle is continuous and is a closed loop path.

Figure 4:
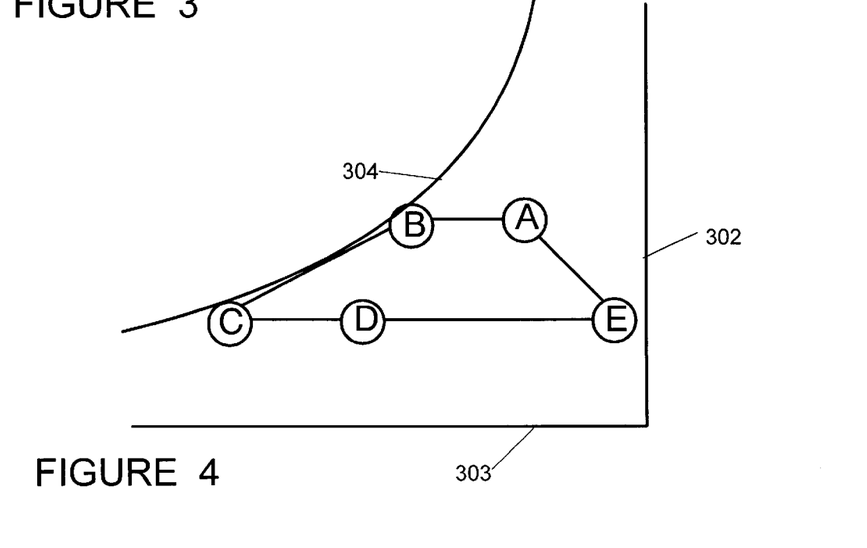
FIG. 4 is a simplified psychometric chart illustrating the change of conditions of the air or gas as it moves through the system of FIG. 3.

With reference to the FIG. 4, there is shown a simplified psychometric chart illustrating the thermal process in the second path of FIG. 3, the path identified as the closed loop regeneration path 170. In FIG. 4, the vertical axis represent the content of water, weight per the volume of air or gas 302. The horizontal axis 303 represent the sensible temperature, measured in temperature units. The curve line 304 presents the saturation of air or gas, which means 100% relative humidity. The A point corresponds to the very humid air that is sensible cooled to point B normally without decreasing humidity or content of water vapor. From B, the air or gas is cooled to a temperature beneath the dew point whereby water precipitates from vapor to liquid stage at point C. Now air or gas is cool and with a lower content of water at A whereafter the mass of dry air is reheated to D and heated to E. This very hot dry air is pulled through the desiccant matrix and the change of vapor pressure rejects all the water vapor to the air stream to be air or gas in stage A which starts the cycle again. The only energy that is lost in this cycle is the condensate water that was recollected out of the loop in the stage C. We refer to FIG. 4 as the psychometrics process that relates to the process represented in FIG. 3.

Figure 5:
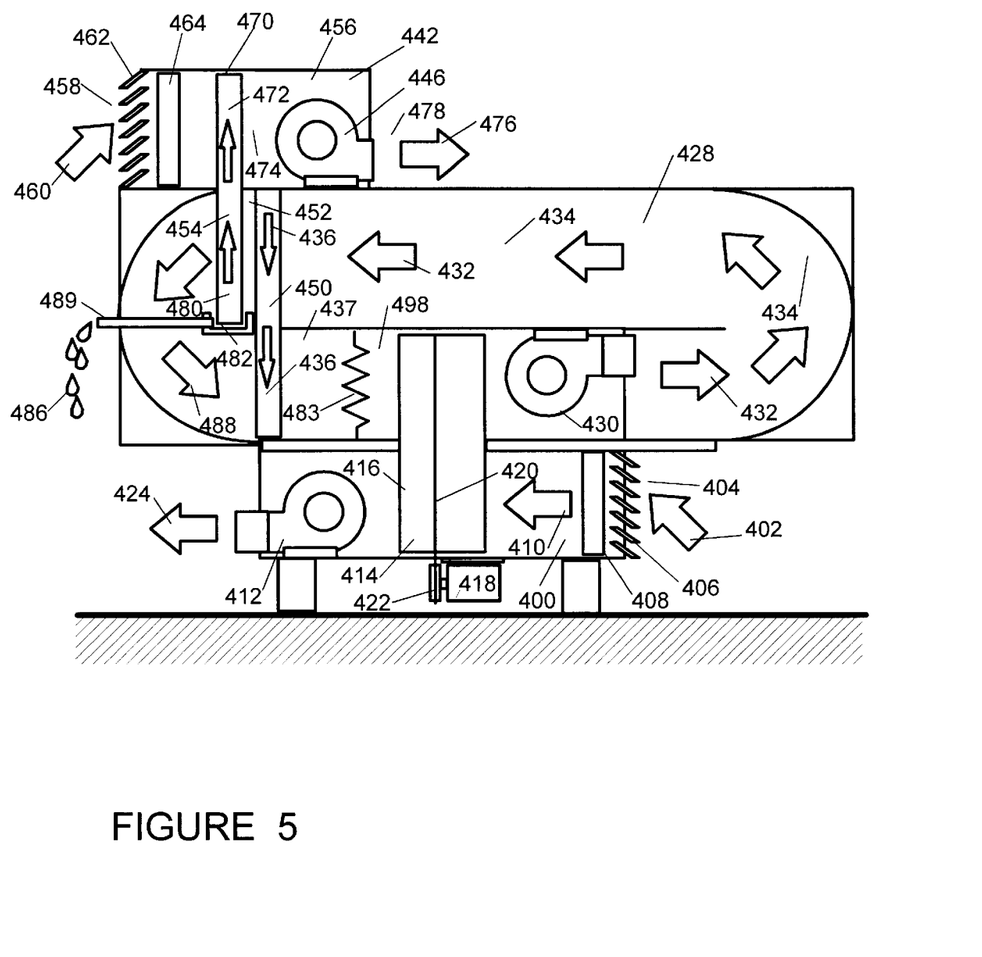
FIG. 5 and FIG. 6 are a side elevation view similar to FIG. 3 but illustrating with more detail a third path to be used as the fluid cooler device.

Shown in FIG. 5 there is side elevation view with parts removed. This embodiment constitutes a schematic illustration of the system shown in FIG. 3 but is a secondary embodiment. The first path 400 is integrated for an air or gas intake 402 comprising of an undesired content of humidity, higher than is required. Such air or gas is drawn through the outside air intake 404 and louver 406 and air filter 408 resulting in filtered air 410 which is moved by means of suction provided by the forced air intake blower 412. The input air 402 is then forced through a desiccant matrix or core 414. This matrix can be shaped in the form of wheel 416 by rotation effected through a motorized driving mechanism 418. Motion is transmitted by a belt or chain 420. The relation between motorized driver 418 and belt or chain 420 is through a pulley or roller 422. Very dry air 424 after the desiccant matrix is pulled by blower 412 which delivers this air 424 as conditioned or processed air essentially free from moisture.

A second path or closed loop regeneration path 428 is integrated by a regeneration blower 430 that functions to push the very humid air or gas 432 through a duct or passage 434. The air or gas 432 is drawn through a heat exchanger 450 across the precooling section 436 of this heat exchanger. The air 432 is precooled as air or a gas stream 452 which is then pushed through a condenser 454, a heat exchanger that allows the cooling of the air or gas to a temperature under the dew point using a third path or cooler path 442 defined by air intake to the third path 458. The air 460 goes across louvers 462 and air filter 464 being drawn by the pull of the blower 466 through the heat exchanger 470 which is the top section, cool end or evaporator side 472. Sensible heated air 474 is pulled through the heat exchanger to the blower and pushed out of the path as exhaust air or gas 476 for the exhaust outlet 478. The sensible heat gain in air or gas 478 is taken for the heat exchanger 470 in the condenser side 472 as energy required to drive the second path.

The precooled air or gas 452 when moved across the condenser 452 condensates the humidity content 480 which is collected as a liquid in a drain pan 482. Such liquid is drained out of the closed loop regeneration path 428 in a liquid state 486 through a drain tube 489. The air or gas 488 now is dryer than air or gas 452. Air or gas 488 is pulled by closed loop regeneration blower 430 across heat exchanger 450 at a reheated section 436. The air 437 is dry and warm and is to be heated up by a heater 483. The heat for this step is generated by an external energy source, as for example electricity. The heated air 498 is now dry and hot and is drawn by the pull effect of the blower 430 across the desiccant matrix or core 416. This changes the vapor pressure of the desiccant contained in the matrix 416 thereby rejecting the humidity contents of 498. This is pulled by blower 430. As air pr gas 432 that will be regenerated again. The cycle is continuous and is a closed loop path.

Figure 6:
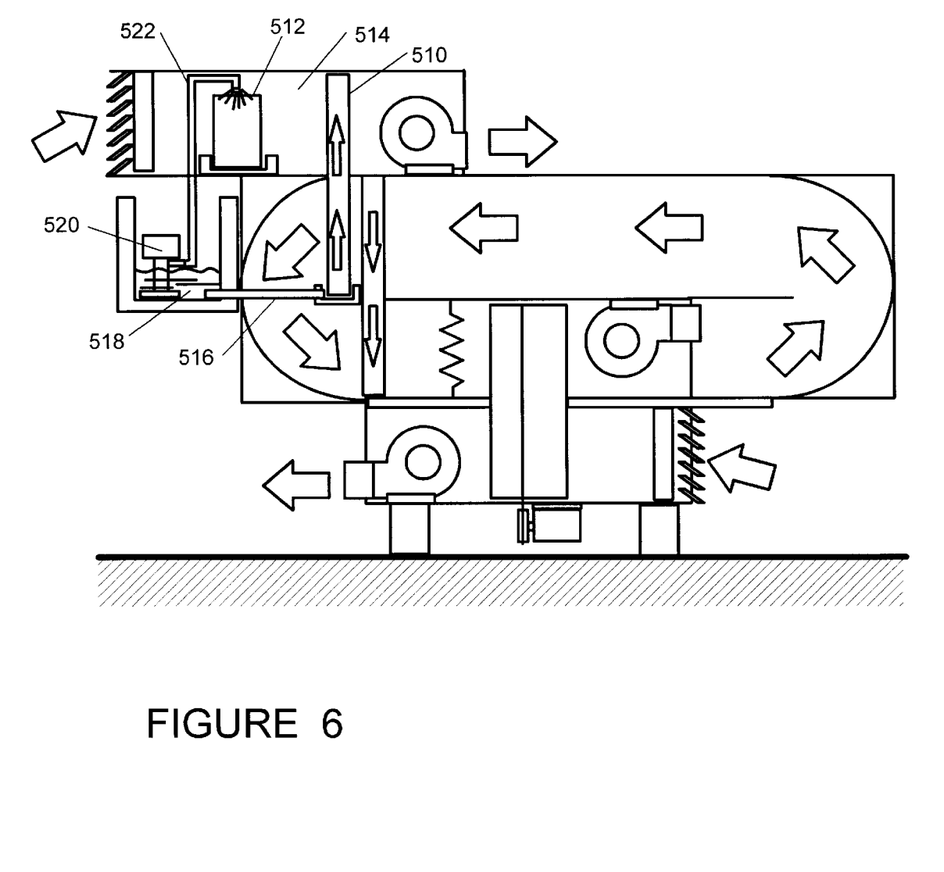

Shown in FIG. 6 is a elevation view similar to FIG. 5 but illustrating an alternative embodiment using the energy of evaporation of the water to improve the cooling effect over the heat exchanger 510. It uses an evaporative pad 512 to distribute the water evenly. This will cool the air steam 514, increasing the cooling capacity and, as a consequence, the condensation. The condensation outlet 516 in the second path will be recollected by a pan 518 and conveyed by a pump 520, across the piping 522 to be sprayed over the evaporative path 512. The energy that drives the second path is represented as electrical heat and can be replaced by any alternate source of energy from the primary embodiment.

Figure 7:
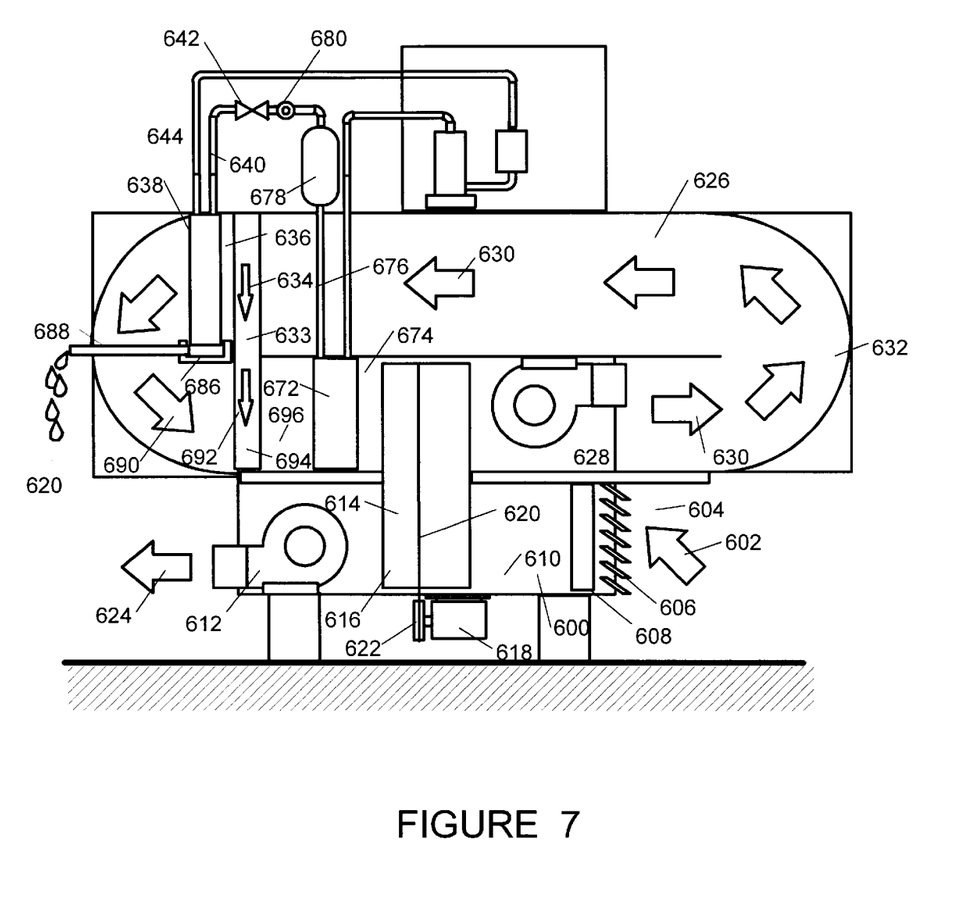
FIG. 7 and FIG. 8 are schematic illustrations of an alternate embodiment using a total refrigeration cycle to act as fluid cooler and fluid heater devices.
Figure 8:
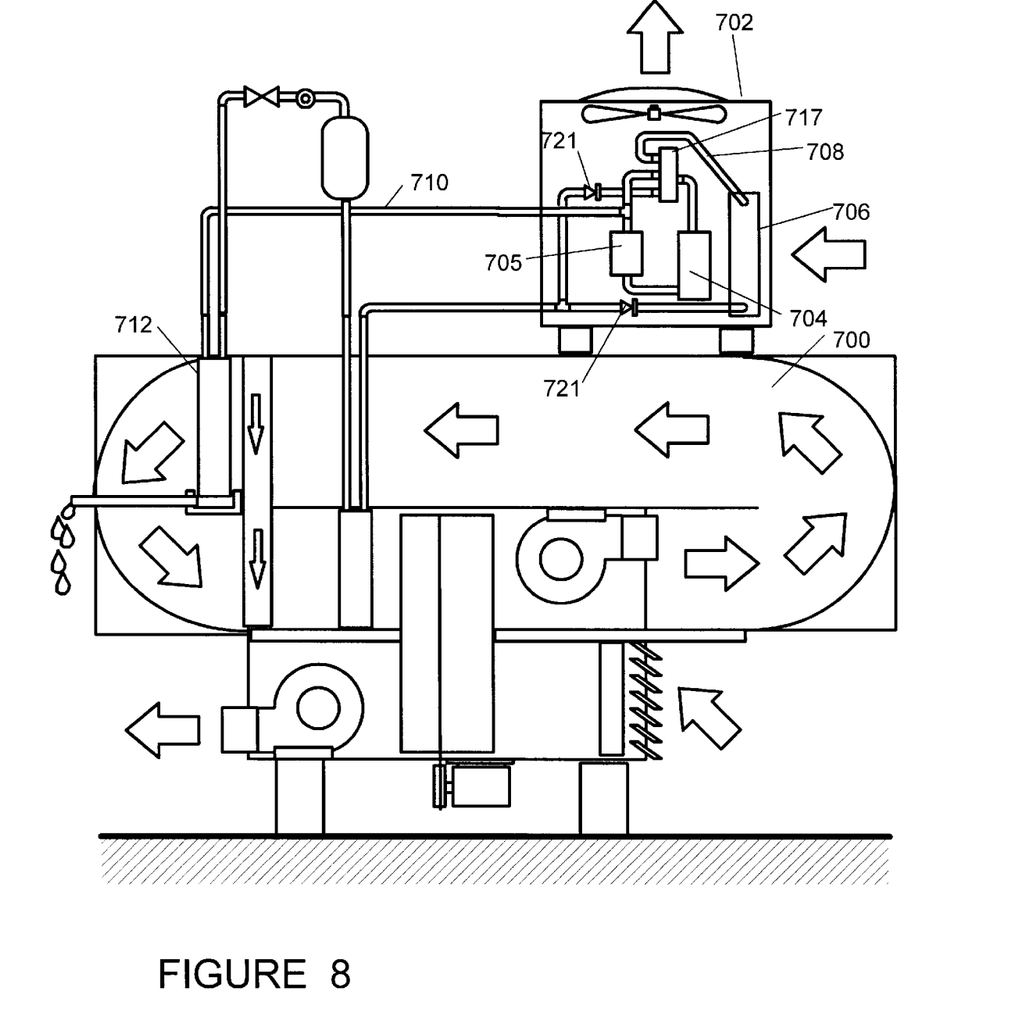

FIG. 7 and FIG. 8 illustrate variations of the embodiments shown in FIG. 3 and 5 using a vapor compression principle to generate the heating and cooling effect that is required to operate the system.

Shown in FIG. 7 is a side elevation view with parts removed and constituting a schematic illustration of the systems shown in FIG. 3 and FIG. 5. In this embodiment, the first path 600 is integrated for an air or gas intake 602 comprising of an undesired content of humidity, higher than is required. Such humid gas is drawn through outside air intake 604 and louver 606 and air filter 608 creating filtered air 610 by means of suction provided by the forced air intake blower 612. Such blower further forces system input air 602 through the desiccant matrix or core 614. This matrix is preferably shaped in the form of a wheel 616. Its rotation is effected by a motorized driving mechanism 618. Motion is transmitted by a belt or chain 620. The relation between motorized driver 618 and belt or chain 620 is with a pulley or roller 622. Very dry air 624 after the desiccant matrix is pulled by blower 612 which delivers this air 624 as conditioned or processed air.

A second path or closed loop regeneration path 626 is integrated by regeneration blower 628 that pushes the very humid air or gas 630 through a duct or passage 632. The air or gas 630 is then drawn through a heat exchanger 633 across the precooling section 634 of this heat exchanger. The air 630 is precooled as air or gas stream 636 and is then pushed through a condenser 638, a heat exchanger that allows the cooling of the air or gas to a temperature under the dew point using an external cooling generator device that is a vapor-compression system. Such system comprises a evaporator 638, a heater exchanger that allows the air or gas to cool under the dew point, using as the fluid cooler the expansion of liquid refrigerant 640 across the expansion device 642. This refrigerant exits from the evaporator, that acts as a condenser in the second path 638 by a tube 644 while in the gas stage to an accumulator 666 and taken as gas through a tube 668 to be compressed in compressor 670 directed to the hot gas refrigerant to a refrigerant condenser 672 that acts as a heater in the second path. The heat is rejected to the air stream 674. The refrigeration continues its travel across the pipe 676 outlet of the condenser, in a direction toward the receiver 678. In this stage the refrigerant is liquid and goes across a sight gas 680. It is expanded again by the expansion device 642 and the cycle will start again. In this embodiment, heat and cool are required for driving the vapor compression cycle using all the energy inside the close loop regeneration system while using electricity as primary source.

The precooled air or gas 636 when passing 638 condensates the humidity content 684. The condensate is recollected as a liquid in a drain pan 686 and drained out of the closed loop regeneration path 626 through a drain tube 688 in liquid state 620. The air or gas 690 now is dryer than air or gas 630. Air or gas 690 is pulled by closed loop regeneration blower 628 across heat exchanger 692 and past a reheated section 694. The air 672 is dry and warm to be heated up by a heat exchanger 698.

In the second path 626, the heated air 674 is now dry and hot and is drawn by the pull effect of the blower 628 across the desiccant matrix or core 614. This changes the vapor pressure across the desiccant contained in the matrix 614, rejecting the humidity contents and generating a flow 630. This is moved by blower 628, air or gas 630 that will be regenerated again. The cycle is continuous and is a closed loop path.

FIG. 8 is a side elevation view with parts removed which constitutes a schematic illustration of the system shown in FIG. 7, but in accordance with another alternative embodiment of the invention with the first path 700 like the FIG. 7 embodiment. In such embodiment, the fluid cooler device and the fluid heating device are replaced by a vapor compression cycle using a unitary air conditioning system and/or heat pump 702. Such air conditioning system has compressor 704 and an accumulator 705 and a condenser coil 706. Such condenser coil has coupling pipes 708 between the air conditioning and the second path or closed loop regeneration 710. Next provided is an evaporator coil 712. Such coil is adapted to receive air and uses a condenser in the second path.

The difference between the FIGS. 7 and 8 embodiments is in the use of a four way valve 716 and an associated solenoid 717. Such valve and solenoid are located to provide alternative flow paths for the refrigerant between the outdoor recondenser as a third path and an indoor condenser. A check valve 721 is located in the lines to avoid round short cycles. This system can be arranged to reject some heat outside the system when it is not necessary to use all this heat inside the system.

Figure 9:
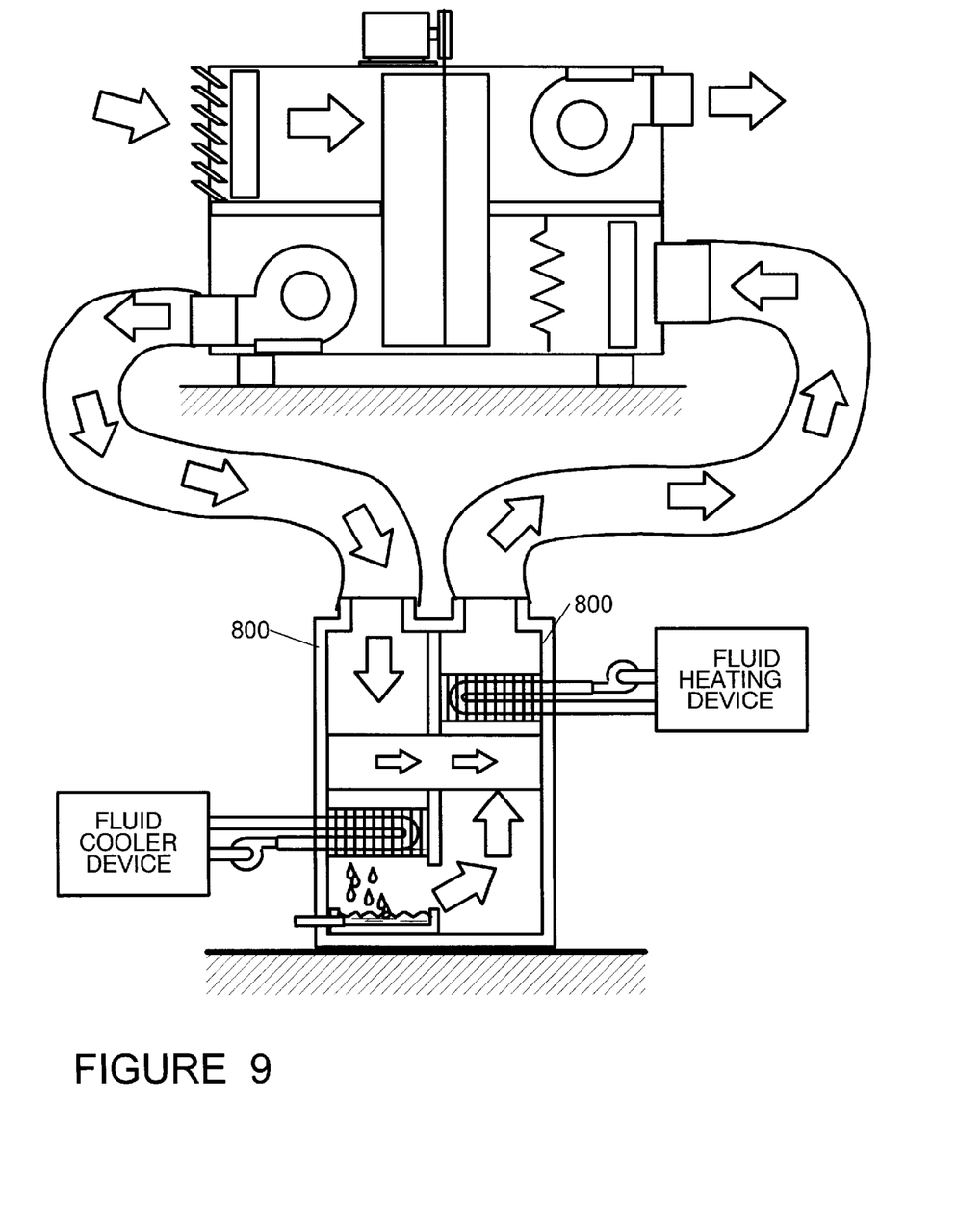
FIG. 9 is a side elevation view of a prior art machine like FIG. 1 and a retrofit attachment as an alternative to update the technology to the process described in this invention, illustrating the connection of techniques with the prior art system.

FIG. 9 is an embodiment which constitutes a variation of the embodiment of FIG. 3. FIG. 9 constitutes a side elevational view of a prior art machine such as FIG. 1. Such FIG. 9 embodiment is designed as a retrofit attachment 800 to update the prior art technology to the process described in this invention, illustrating the connection of techniques of flexible conduits with the prior art system.

Figure 10:
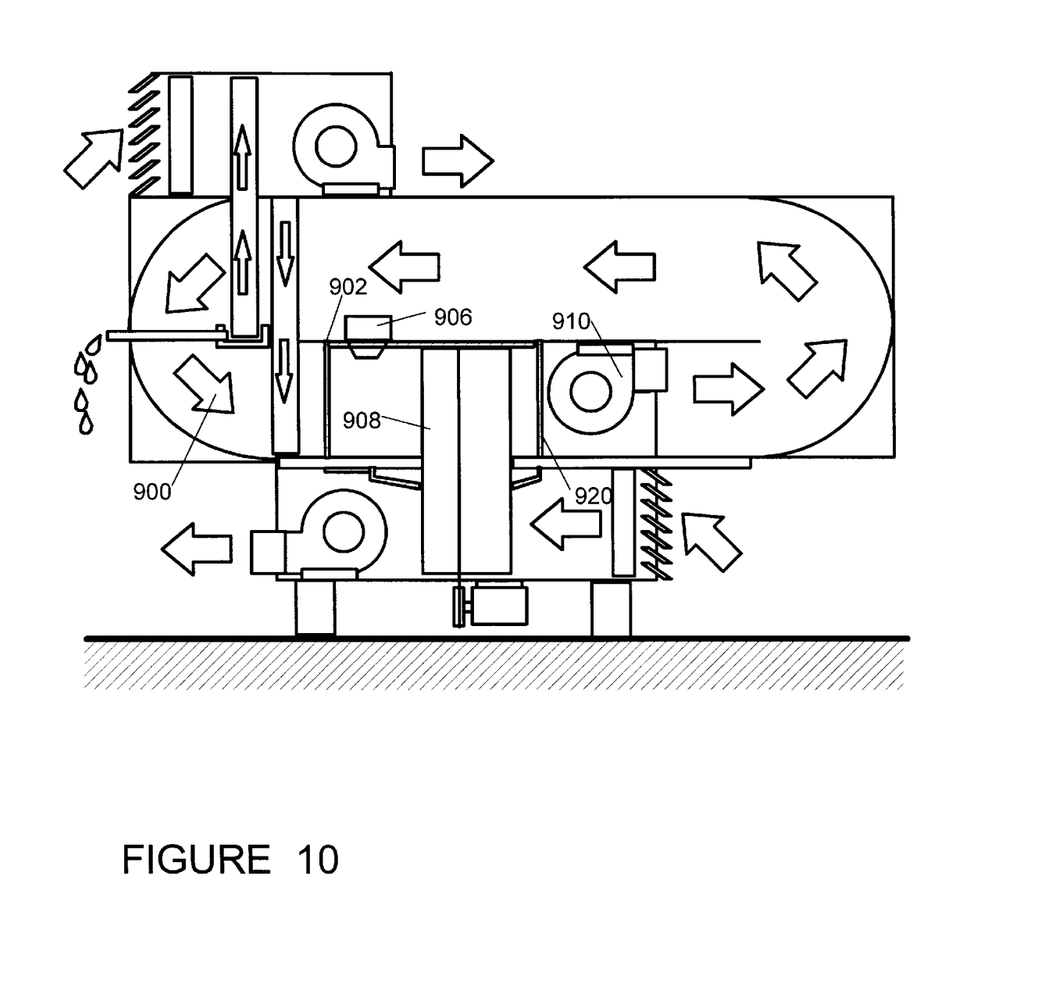
FIG. 10 is a side elevation of a modified secondary embodiment using high frequency microwaves generator to act as a fluid heater device.

FIG. 10 is a variation of the primary embodiment in FIG. 3 and a variation of secondary embodiment is FIG. 5. In this FIG. 10 embodiment, the variation in this path is that the air 900 is pulled across a metal grid that acts as a shield on a side of a heating compartment 902. The heating compartment 904 is a reflective metallic member exposed to the main surface with the objective of reflecting and not like microwaves scope. The microwaves generator 906 generates high frequency microwaves directed to the matrix 908 that contains the desiccant material. This desiccant is associated to molecules of water that act as a conductor, attract the microwaves and make vibrations against increased friction, resulting in considerable heat generation. This heat changes the vapor pressure of the desiccant material and liberates the water vapor or humidity contents. The air is the media to carry over the vapor across the grid that acts as a microwave shield in the outlet of the heating compartment 920. The pulling action of the air is realized by the blower 910 identified as a closed loop regeneration blower. When the air passes the blower it is a humid air to be regenerated again. The cycle is continuous and is a closed loop path.

In summary, the invention may be considered as an apparatus for conditioning a fluid, preferably a gas and normally air through the removal of moisture from the air to be conditioned. Such apparatus comprises a first path for a first flow of air to be dehumidified, the first path having an input end and an output end with a first blower between the input end and the output end to effect the movement of air from the input end to the output end. Such apparatus also includes a second path for a second flow of air, the second path being independent of the first path and adapted to remove moisture from the second flow of air. The second path is in a closed loop configuration with a second blower for continuously moving the second flow of air around the second path. A plurality of temperature changing devices are sequentially positioned in the second path including an air precooling device, a cooling condenser device for condensing moisture from the second flow of air, a reheating device coupled to the precooling device, and a heating device. Lastly, a desiccant wheel with a motor to rotate the wheel in a continuous path of travel through a first zone and a second zone, the first zone being in the first path of travel between the input end and the output end, the second zone being in the second path of travel between the heating device and the precooling device.

In addition, the present invention may also be considered as including a method for conditioning air or other gas through the removal of moisture from air to be conditioned. Such method comprises the step of providing a first path for a first flow of air to be dehumidified, the first path having an input end and an output end with a first blower between the input end and the output end to effect the movement of air from the input end to the output end. The method includes the step of providing a second path for a second flow of air, the second path being independent of the first path and adapted to remove moisture from the second flow of air, the second path being in a closed loop configuration with a second blower for continuously moving the second flow of air around the second path and with a plurality of temperature changing devices sequentially positioned in the second path including an air precooling device, a cooling condenser device for condensing moisture from the second flow of air, a reheating device coupled to the precooling device, and a heating device. The method also includes the step of providing a desiccant wheel. Lastly, the method includes the step of rotating the wheel in a continuous path of travel through a first zone and a second zone, the first zone being in the first path of travel between the input end and the output end, the second zone being in the second path of travel between the heating device and the precooling device.

Figure 11:
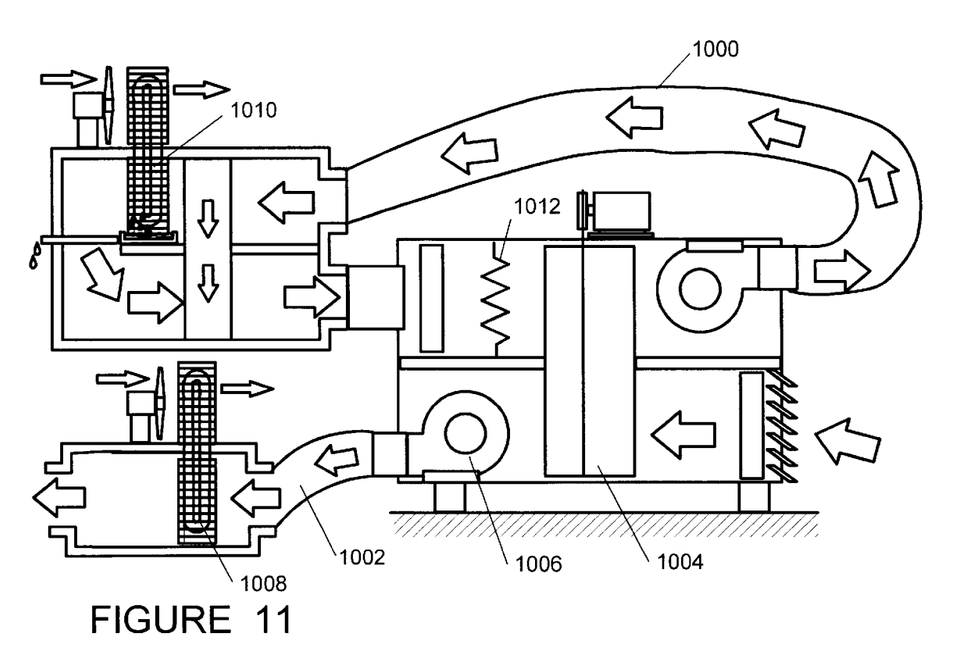
FIG. 11 is a schematic illustration of another alternate embodiment of the invention.

FIG. 11 illustrates a further embodiment of the invention. The FIG. 11 embodiment is similar in configuration to the embodiment shown in FIG. 9. In the FIG. 11 embodiment, there is a closed loop regeneration path 1000 shown as in the upper extent corresponding to path 800 of the FIG. 9 embodiment. The lower segment of the FIG. 11 embodiment illustrates a process air path 1002 which is an open path for air to be treated as it moves from the atmosphere at the right to the building receiving the conditioned air on the left. A desiccant wheel 1004 functions to dry the incoming air whereafter a fan 1006 continues to move the hot and dry air through the process air path. Following the fan, one end of a heat pipe 1008, or other heat exchanger, functions to further cool the process air before entering the room receiving the conditioned air. With regard to the upper closed loop regeneration path 1000, essentially the same as the equivalent portion of the FIG. 9 embodiment, adds a heat pipe 1010, or other heat exchanger, to constitute the equivalent of the fluid cooler of the FIG. 9 embodiment. A further change from the FIG. 9 embodiment is the use of a resistant heating element 1012 in the flow path for the regeneration air in advance of the desiccant wheel.

Figure 12:
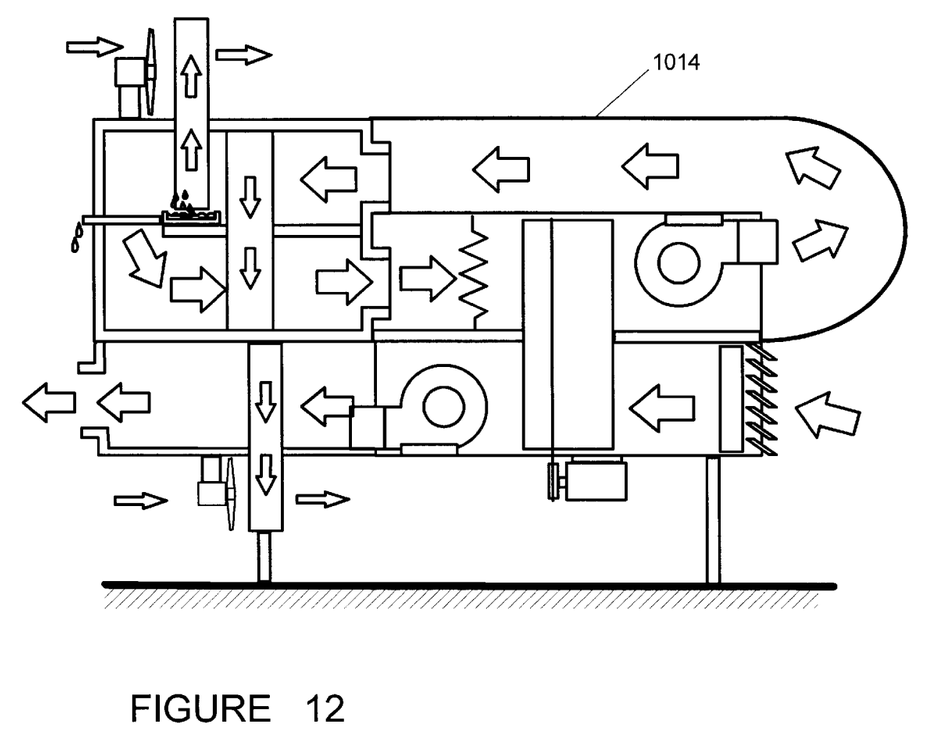
FIG. 12 is a schematic illustration of yet another alternate embodiment of the invention.

The embodiment of FIG. 12 is similar to the previously described embodiment of FIG. 11. Such embodiment includes a closed loop regeneration path 1014 to replace the add-on aspects as set forth in FIG. 11. In this manner, the FIG. 12 embodiment constitutes an air conditioning package and not an add-on to an existing system as is the case with the FIG. 11 embodiment.

Figure 13:
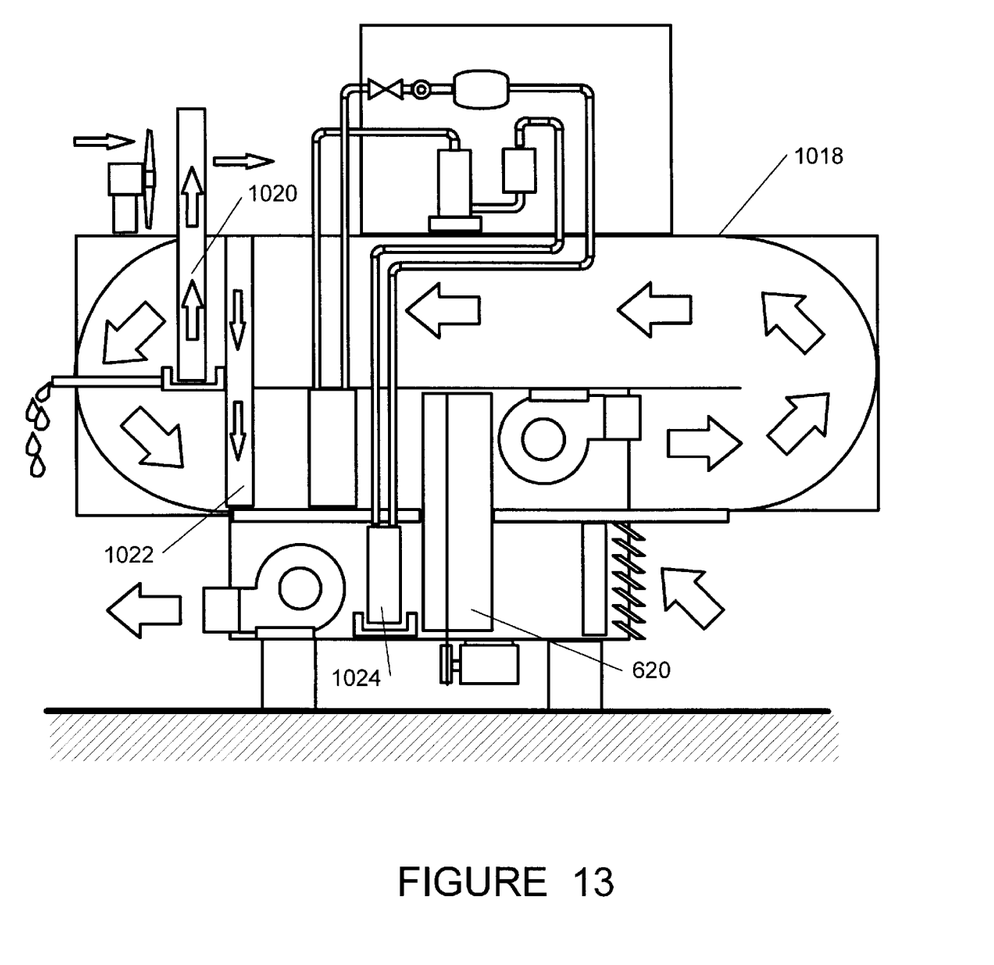
FIG. 13 is a schematic illustration of yet another alternate embodiment of the invention.

FIG. 13 is similar to that as shown in FIG. 7 and, like the embodiment of FIG. 12, is intended for being manufactured and sold as a packaged unit not an add on. In the FIG. 13 embodiment, there is a closed loop regeneration path 1018 in the upper extent. In the process air path of the lower region, there is a desiccant wheel 620 similar to that of the FIG. 7 embodiment. Further, in the FIG. 13 embodiment, a heat pipe 1020 is used for cooling the air in the closed loop regeneration path. Such heat path 1020, or other heat exchanger, is used as a replacement for the evaporator 638 as used for an analogous function in the FIG. 7 embodiment. A further change is to move the evaporator 636 of the FIG. 7 embodiment to the process air path. The heat pipe or other heat exchanger 1022 as shown in FIG. 13 stays to perform the analogous function of the heat pipe 633 of the FIG. 7 embodiment. The evaporator 636 of the FIG. 7 embodiment is also moved and repositioned as evaporator 1024 in the flow path for the process air following the desiccant wheel to function as the heat pipe 1008 of FIG. 11 for the purpose of cooling air upon entering the room to be cooled.

Figure 14:
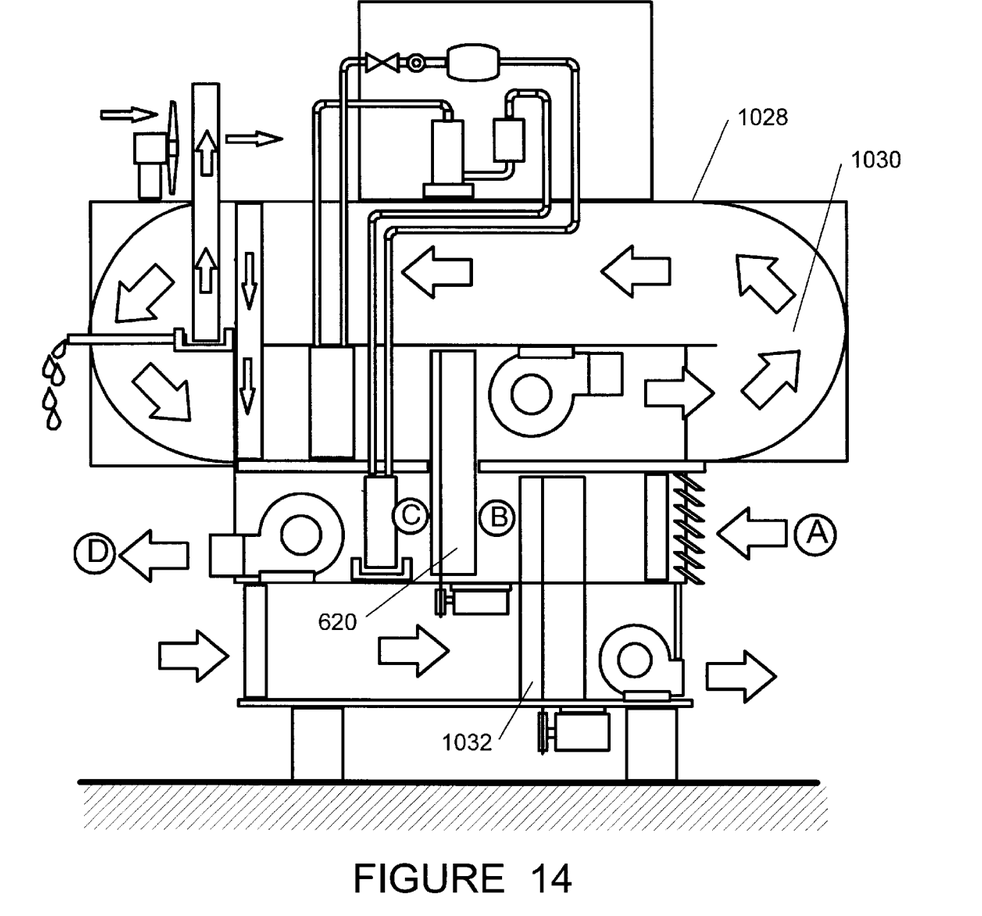
FIG. 14 is a schematic illustration of yet another alternate embodiment of the invention.

The FIG. 14 embodiment is similar to the FIG. 13 embodiment. It has an upper chamber 1028 for the recirculation of the regeneration air and includes path 1030 essentially identical to that shown in FIG. 13. In the FIG. 14 embodiment, a new wheel 1032 is added for functioning with the process air being recirculated with respect to the room to receive the conditioned air. Although the wheel is structurally the same as the desiccant wheel of the prior embodiments, it functions as a total energy wheel, or enthalpy wheel, for heat recovery purposes. The FIG. 14 embodiment also employs the primary desiccant wheel 620 which is equivalent to the FIG. 7 embodiment, and as also employed in the FIG. 13 embodiment, it functions for drying the process air. The lowermost horizontal flow path of the FIG. 14 embodiment moves air from inside the building to the lower extent of the enthalpy wheel 1032 and exhausts to atmosphere. Above that flow path, there is a flow path for atmospheric air being sent to the lower extent of process wheel 620 into the room which is adapted to receive the process air. The atmospheric air along this path passes through point A to point B where it becomes cool and dry air. At point C, the air is warm and very dry whereafter it is cooled and dried prior to entering the room receiving the process air.

Figure 15:
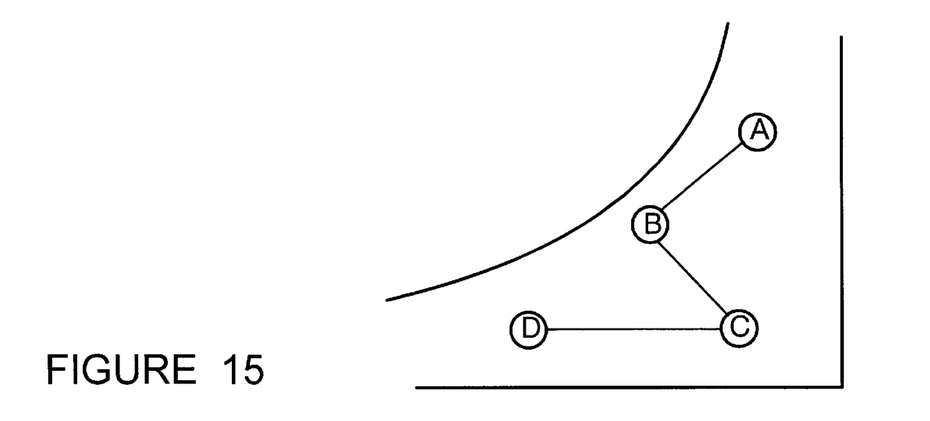
FIG. 15 is a psychometric chart showing the change of the conditions of the earth flowing along the flow path passing through circles A, B, C and D.

The FIG. 15 showing is a psychometric chart setting forth the conditions of the process air as it passes from atmosphere to the room sequentially from points A to B to C and to D consecutively.

Figure 16:
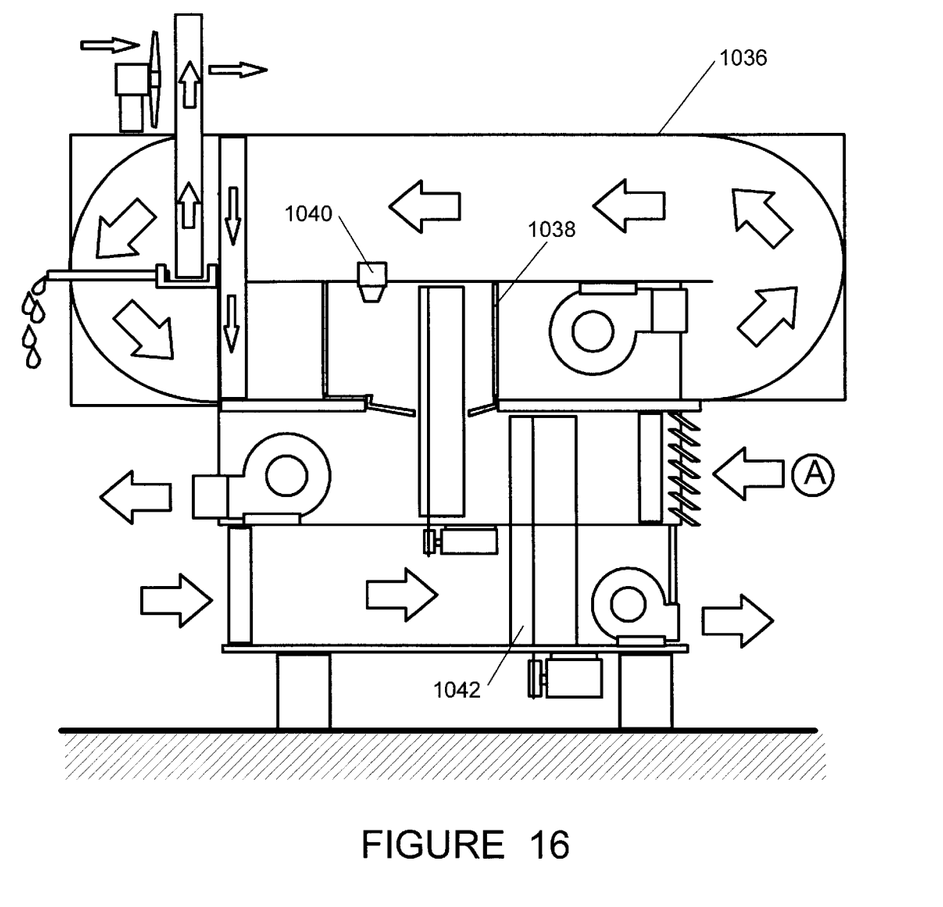
FIG. 16 is a schematic illustration of yet another alternate embodiment of the invention.

The final embodiment is shown in FIG. 16. In such embodiment, the basic components are the same as in the FIG. 14 embodiment. Such FIG. 16 embodiment includes an upper chamber 1036 for the closed loop regeneration air. In the lower path thereof there is a microwave chamber 1038 analogous to a similar chamber 906 of FIG. 10. A microwave generator 1040 within the chamber 1038 functions in a manner similar to that of the FIG. 10 embodiment. In the lowermost extent of the FIG. 16 embodiment, within the flow path of the moving process air, a total energy wheel 1042 is employed in the same manner as that disclosed in the embodiment of FIG. 14. Consequently, the lowermost flow path takes return air from the room of the building receiving the conditioned air and exhausts it to atmosphere, moving from left to right in FIG. 16, after passing through the total energy wheel 1042. As such, atmospheric air, as marked with A, is moved in a manner similar to that of FIG. 14 and treated as in the FIG. 14 embodiment before being fed to the room receiving the conditioned air.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. Apparatus for conditioning air through the removal of moisture from air to be conditioned comprising:

a first path for a first flow of air to be dehumidified, the first path having an input end and an output end with a first blower between the input end and the output end to effect the movement of air from the input end to the output end;

a second path for a second flow of air, the second path being independent of but adjacent to and linearly aligned with the fist path along at least a portion of their extents and adapted to remove moisture from a desiccant member, the first and second paths having a common separating wall therebetween, the second path being in a closed loop configuration with a second blower for continuously moving the second flow of air around the second path and with a plurality of temperature changing devices sequentially positioned in the second path including an air precooking device, a cooling condenser device for condensing moisture from the second flow of air with an associated line extending through the second path following the cooling condenser device for removing condensed moisture from the condenser device in the second path to exterior of the second path, a reheating device coupled to the precooling device, and a heating device, the precooling device being one portion of a heat exchanger fixedly positioned immediately in advance of the precooling device and the preheating device being another portion of the heat exchanger fixedly positioned immediately in advance of the reheating device;

a desiccant wheel with a motor to rotate the wheel in a continuous path of travel through a first zone and a second zone, the first zone being in the first path of travel between the input end and the output end, the second zone being in the second path of travel between the heating device and the precooling device; and a final cooling component for the air to be dehumidified, the final cooling component having a first region in the first path between the desiccant wheel and the output end and having a second region outside of the first path, the final cooling component being a heat pipe with its second region in the path of flow of ambient air.

2. Apparatus for conditioning air through the removal of moisture from air to be conditioned comprising:

a first path for a first flow of air to be dehumidified, the first path having an input end and an output end with a first blower between the input end and the output end to effect the movement of air from the input end to the output end;

a second path for a second flow of air, the second path being independent of but adjacent to and linearly aligned with the fist path along at least a portion of their extents and adapted to remove moisture from a desiccant member, the first and second paths having a common separating wall therebetween, the second path being in a closed loop configuration with a second blower for continuously moving the second flow of air around the second path and with a plurality of temperature changing devices sequentially positioned in the second path including an air precooling device, a cooling condenser device for condensing moisture from the second flow of air with an associated line extending through the second path following the cooling condenser device for removing condensed moisture from the condenser device in the second path to exterior of the second path, a reheating device coupled to the precooling device, and a heating device, the precooling device being one portion of a heat exchanger fixedly positioned immediately in advance of the precooling device and the preheating device being another portion of the heat exchanger fixedly positioned immediately in advance of the reheating device;

a desiccant wheel with a motor to rotate the wheel in a continuous path of travel through a first zone and a second zone, the first zone being in the first path of travel between the input end and the output end, the second zone being in the second path of travel between the heating device and the precooling device; and a final cooling component for the air to be dehumidified, the final cooling component having a first region in the first path between the desiccant wheel and the output end and having a second region outside of the first path, the final cooling component being an enthalpy wheel rotatable between the first path and a flow of ambient air.

\* \* \* \* \*